United States Patent [19]
Marasco

[11] Patent Number: 6,056,551
[45] Date of Patent: May 2, 2000

[54] METHODS AND APPARATUS FOR COMPUTER AIDED READING TRAINING

[76] Inventor: Bernie Marasco, 1520 Stoneham St., Superior, Colo. 80027

[21] Appl. No.: 09/141,917

[22] Filed: Aug. 28, 1998

Related U.S. Application Data

[60] Provisional application No. 60/060,893, Oct. 3, 1997.

[51] Int. Cl.[7] .............................. G09B 17/00; G09B 17/04
[52] U.S. Cl. ............................................. 434/178; 434/179
[58] Field of Search ..................................... 434/156, 157, 434/167, 169, 176, 178, 179, 180, 182

[56] References Cited

U.S. PATENT DOCUMENTS

| | | | |
|---|---|---|---|
| 3,878,327 | 4/1975 | Uhler | 178/7.5 R |
| 3,938,139 | 2/1976 | Day | 345/194 |
| 4,160,242 | 7/1979 | Fowler et al. | 345/169 |
| 5,147,205 | 9/1992 | Gross et al. | 434/169 |
| 5,697,793 | 12/1997 | Huffman et al. | 434/317 |
| 5,873,109 | 2/1999 | High | 707/517 |

FOREIGN PATENT DOCUMENTS 0202783  8/1989  Japan ..................................... 434/179

*Primary Examiner*—Robert A. Hafer
*Assistant Examiner*—John Edmund Rovnak
*Attorney, Agent, or Firm*—Gene Scott-Patent Law & Venture Group

[57] ABSTRACT

A method and apparatus for computer aided reading training provides for improving reading speed with comprehension, the method comprising the steps of displaying textual matter in a machine readable format; presenting a designated text display area indicia on a video monitor screen; presenting input device controllable operational indicia on the video monitor screen; and displaying the textual matter within the word display area indicia on the video monitor screen, the textual matter being segmented into textual portions, each of the portions appearing on the monitor screen for a selected duration and at the termination of the selected duration being instantly replaced by each subsequent one of the textual portions in turn, the operational indicia being functional for adjusting the position and approximate quantity of textual matter in each of the textural portions.

14 Claims, 6 Drawing Sheets

METHODS AND APPARATUS FOR COMPUTER AIDED READING TRAINING

This application claims the earlier filing date of United States Provisional Patent application 60/060,893 filed on Oct. 3, 1997, Bernie R. Marasco, applicant.

BACKGROUND OF THE INVENTION

1. Field of the Invention

This invention relates generally to methods for teaching reading skills, and more particularly to a computer method for teaching a variety of reading skills including fast word recognition and fast eye movement resulting in faster reading with comprehension.

2. Description of Related Art

A number of software programs are commercially available to help improve reading speed. These programs generally present one word at a time to a text display area on a monitor screen. They allow one to load plain ascii text files or clipboard text material into the program. Some of these programs allow a change of text font and word presentation rate, i.e., the speed at which words are shown or flashed onto the text display area. A commercial product trademarked Vortex™ by Tenax Software Engineering, provides the choice of center, or left justified text presentation. Another product; RapidReaderm™" by Softology Development Group enables one to see the current location within a document by stopping the flashing of words and presenting the text in normal multi-line fashion with the current word highlighted.

The prior art teaches the use of a computer program to increase the rate of reading speed. However, the prior art does not teach that such a program can be used to adjust the length of textual matter that is flashed at one time, and also does not teach the presentation of textual matter in the manner described, shown and taught in the instant case. The present invention fulfills these needs and provides further related advantages as described in the following summary.

SUMMARY OF THE INVENTION

The present invention teaches certain benefits in construction and use which give rise to the objectives described below.

The present invention is a software program that, when installed in a computer may be advantageously used as a productivity tool and as a self-improvement educational tool. As a productivity tool text is displayed at the center of a text display area on the computer screen and teaches the skill of reading faster. In this mode, the words of a text selection are displayed one after another in rapid succession. More than one word may be displayed at one time. As a self-improvement educational tool the text is advantageously displayed from left to right as if the words of an invisible sentence were made to appear in sequence left to right and in their proper place in each sentence. The speed or rate of word display is set via speed bars that represent slower to faster speeds instead of presetting the desired words per minute. The actual speed (words per minute) is calculated after the user has completed reading. This has the advantage of informing the user of his or her average reading speed instead of presenting an estimate that would result in trying to pre-set the reading speed.

A set of burst (back, repeat and forward) buttons allow for displaying a preset number of words or sentences before stopping. Users can burst back to re-read a previous set of words, repeat to reread the last set of words, or go forward with a new set of words.

A set of search and read controls allows a user to relocate his current reading position to a word/s or sentence containing a set of chosen word/s. The search is performed on the text provided within the currently loaded document or clipboard and is case insensitive. The search can be performed while stopped or reading. This is especially useful for people tying to skim and search through a large volume of material to locate particular subject matter.

A VCR style control allows setting of a current position in a document. Operational controls include Stop, Play, Slide To Position, Go Left or Go Right to set a current location in the document being used. Any number of words may be displayed at a time and this option is mouse selectable. The word "words" is used here and throughout this document in the generic sense and is meant to convey the display of textual material, but which may include symbolic elements also such as individual characters or other language elements such as pictograms, hieroglyphs, kana, hiragana, katakana, shorthand symbols and so on.

Delays can be applied when certain types of punctuation is displayed or when a word of a certain length is displayed. The amount of delay is expressed in terms of speed bars relative, to the current speed setting. If more than one delay condition occurs at the same time the delay amount can be additive or simply the longest specified delay as a choice.

A primary objective of the present invention is to provide a reading improvement means having advantages not taught by the prior art.

Another objective is provide such a means as a software embodiment useful on simple computer machines.

A further objective is to provide such a means that can be adjusted to teach fast word recognition, and also adjusted to teach faster eye movement.

A still further objective is to provide such a means having a method that is an improvement over the prior art, the improvement being in the manner of display of the textual material and the manner of control over such display.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
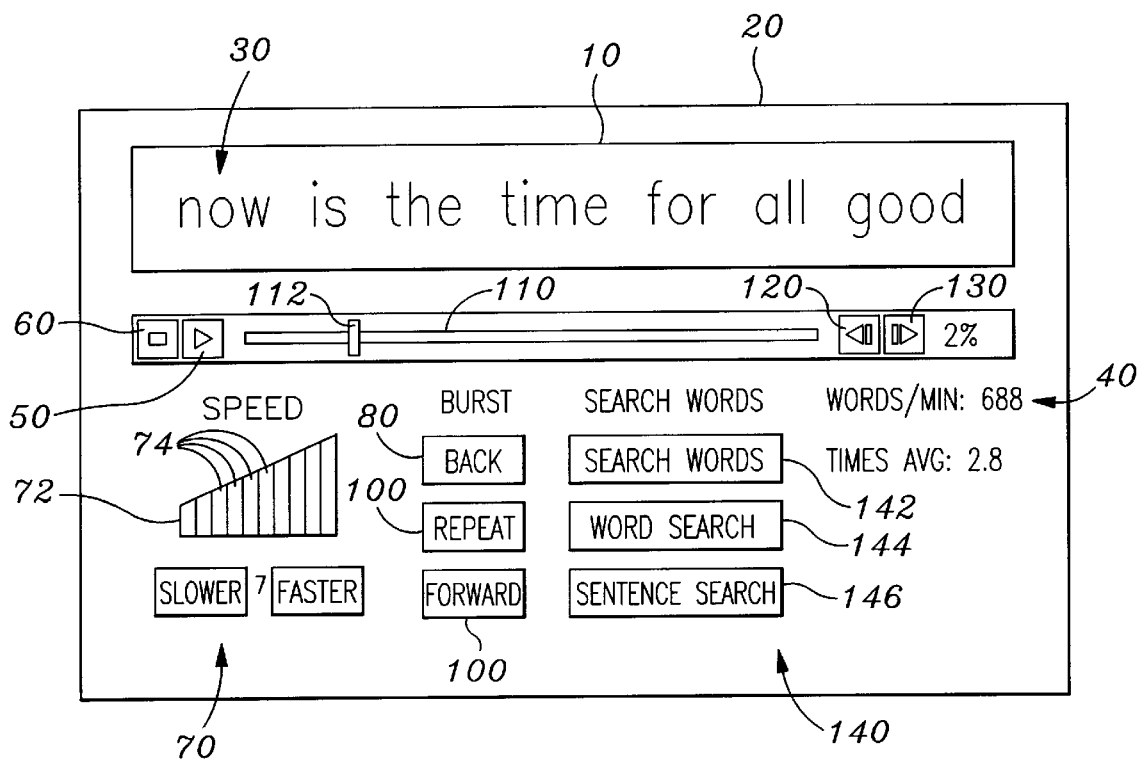
FIG. 1 is a view of the main video screen display of the preferred embodiment of the present invention.

The above described drawing figures illustrate the invention, a method and apparatus for improving reading speed with comprehension. The method comprises the steps of providing textual matter in a machine readable format such as a word processor document; presenting a designated text display area indicia 10 on a video monitor screen 20 as shown in FIG. 1 where "now is the time for all good" is displayed within a rectangular box, the designated text display area indicia 10, as one possible example of this approach; presenting input device controllable operational indicia on the video monitor screen 20; and displaying the textual matter 30 within the word display area indicia on the video monitor screen 10, the textual matter 30 being segmented into textual portions, usually from one to five words, each of the portions appearing on the monitor screen for a selected duration and at the termination of the selected duration being instantly replaced by each subsequent one of the textual portions in turn, the operational indicia being functional for adjusting the approximate quantity of textual matter in each of the textural portions. This is generally selected in a so-called "pull down screen menu" that is functionally accessible by manipulating and positioning a screen pointing device, such as a mouse, used with the computer.

Preferably, each of the portions of the textual matter, in turn, is centered in the word display area from left to right, although each of the portions of the textual matter may alternately be positioned, in turn, to the right of each previously displayed of the portions of the textual matter, as space in the word display area indicia is available therefor, and at the leftmost position of the word display area when such space is not available, i.e., the groups of text may be displayed in sequence as they appear in the sentence including their relative position in the sentence. The textual matter display may be started and stopped, with the screen pointing device which is interconnected and functional so as to be operational for manipulation of the input device controllable operational indicia, i.e., pointing and clicking.

The method provides for displaying the numerical reading rate 40 on the monitor screen 10 upon termination of the displaying of the textual matter. The step of displaying this information only after the completion of the reading is important so that the reader is not distracted by the number during the reading. This is considered an important inventive step distinguishing over prior art.

The apparatus of the present invention comprises a computer system having a means for data storage such as a hard drive, a means for data computation and presentation formatting such as a processor, and a means for data display such as the video monitor or screen 20. The data display means 20, as shown in FIG. 1, comprises an animated designated word display area 10 and a plurality of animated, input device controllable, operational indicia. The data computation and presentation formatting means is enabled for presenting a textual matter data file selected from the data storage means, on the data display means 20 as a series of textual portions in timed sequence with each of the textual portions being replaced by a next said textual portion in turn. Such enablement is possible through standard programming steps of a common nature and within the skill of the ordinary artisan.

The input device controllable, operational indicia comprise a start-play command indicia 50, a stop-play command indicia 60, a speed control command indicia 70, a backup 80, forward 90 and repeat 100 selection command indicia, a location marker indicia 110 pictorially representing an approximate present text location position within the data file selection, a backup by one textual portion indicia 120, and a move-forward by one textual portion indicia 130.

The speed control indicia 70 provides a bar graph 72, the animation thereof indicating the setting of display speed as a color differentiation between individual bars 74 of the bar graph 72.

The input device controllable, operational indicia further comprise a search indicia 140 enabled for searching the textual matter data file. The search indicia 140 is enabled for searching the data file for a single word 142, for multiple words 144 and for a sentence 146.

As previously described, the data display means further provides an indicia for indicating the speed of the data file display 40 after at least a portion thereof has been displayed and preferably when the entire file has been displayed and wherein the data computation and presentation formatting means is enabled for calculating such display speed or rate.

The input device controllable, operational indicia further comprises a scroll indicia 112 enabled for searching the textual matter data file forward or backward and for displaying the data file accordingly. This is accomplished by clicking onto the scroll indicia 112 and dragging it to the right or to the left as own wishes to move forward or backward respectively within the textual matter or data file.

Preferably, the data computation and presentation formatting means is enabled for providing the textual matter to be displayed with hesitations at selected punctuation marks. Thus, when a period, comma or other punctuation appears in the textual matter, presentation is hesitated to an extend that may be programmable by the user. Such access to programming of the manner in which the textual matter is displayed is facilitated by well known means such as pull-down menu items selectable by a pointing device.

Figure 2:
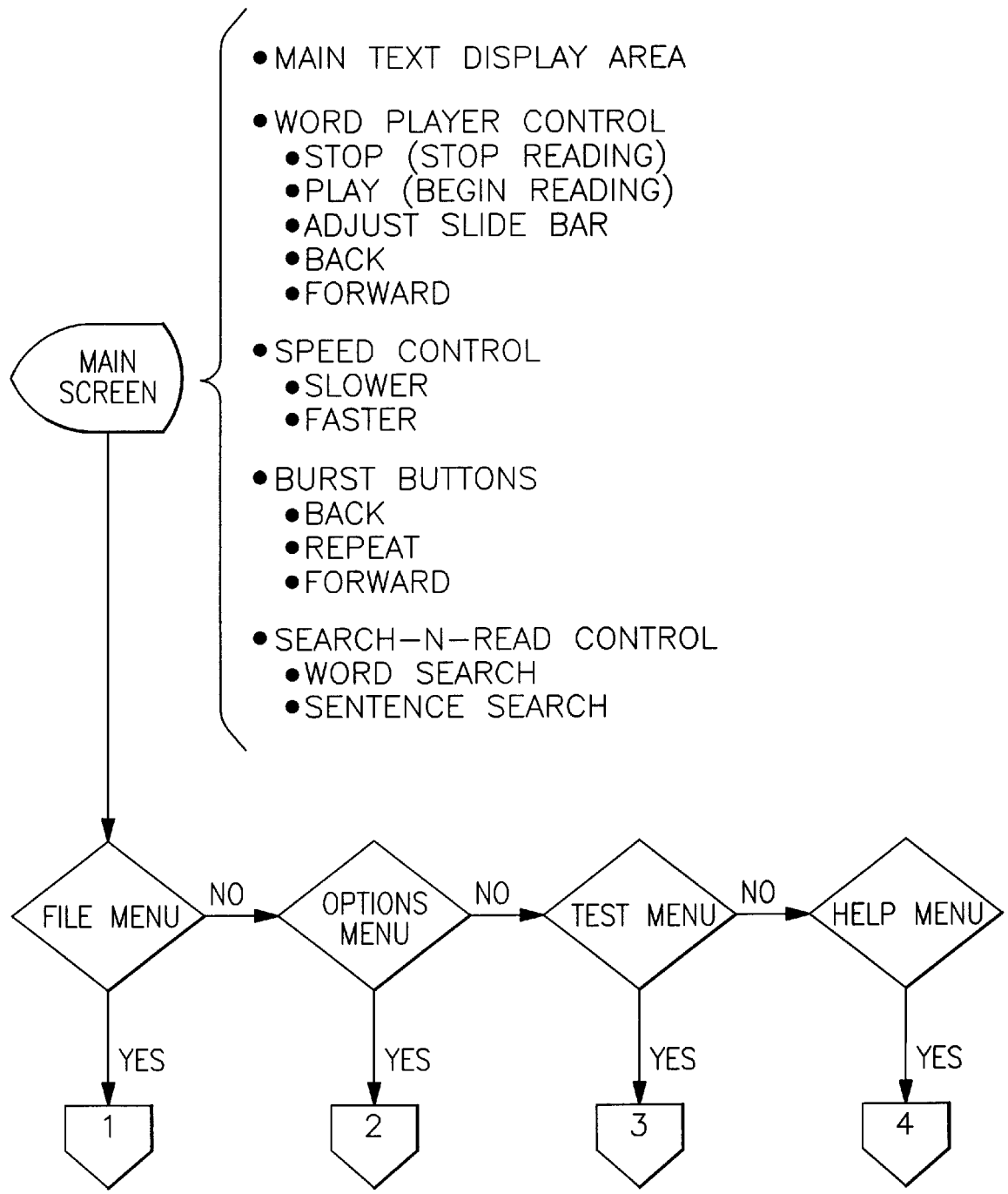
FIGS. 2–6 constitute a logic flow diagram defining the method of the invention.
Figure 3:
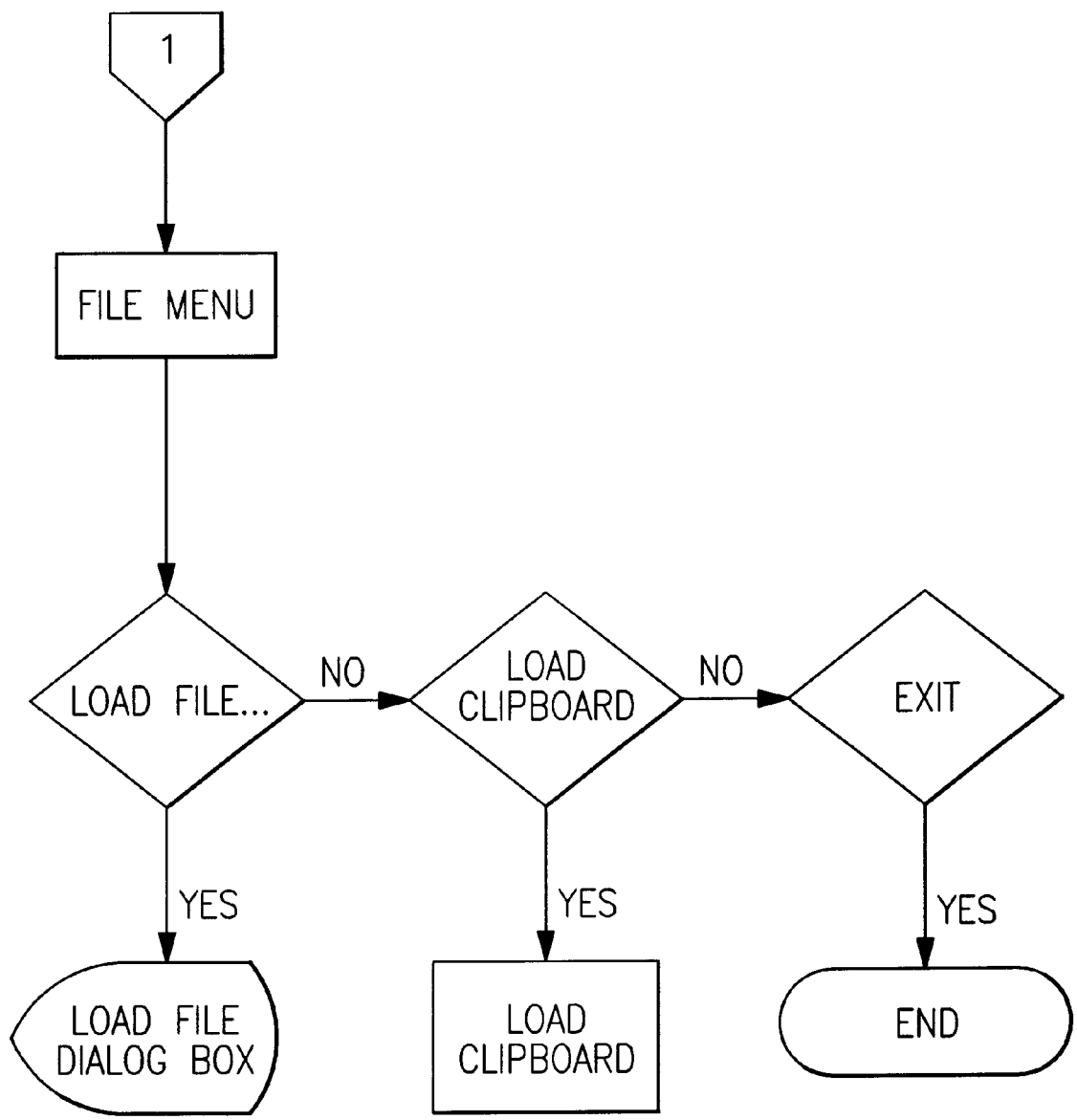
Figure 4:
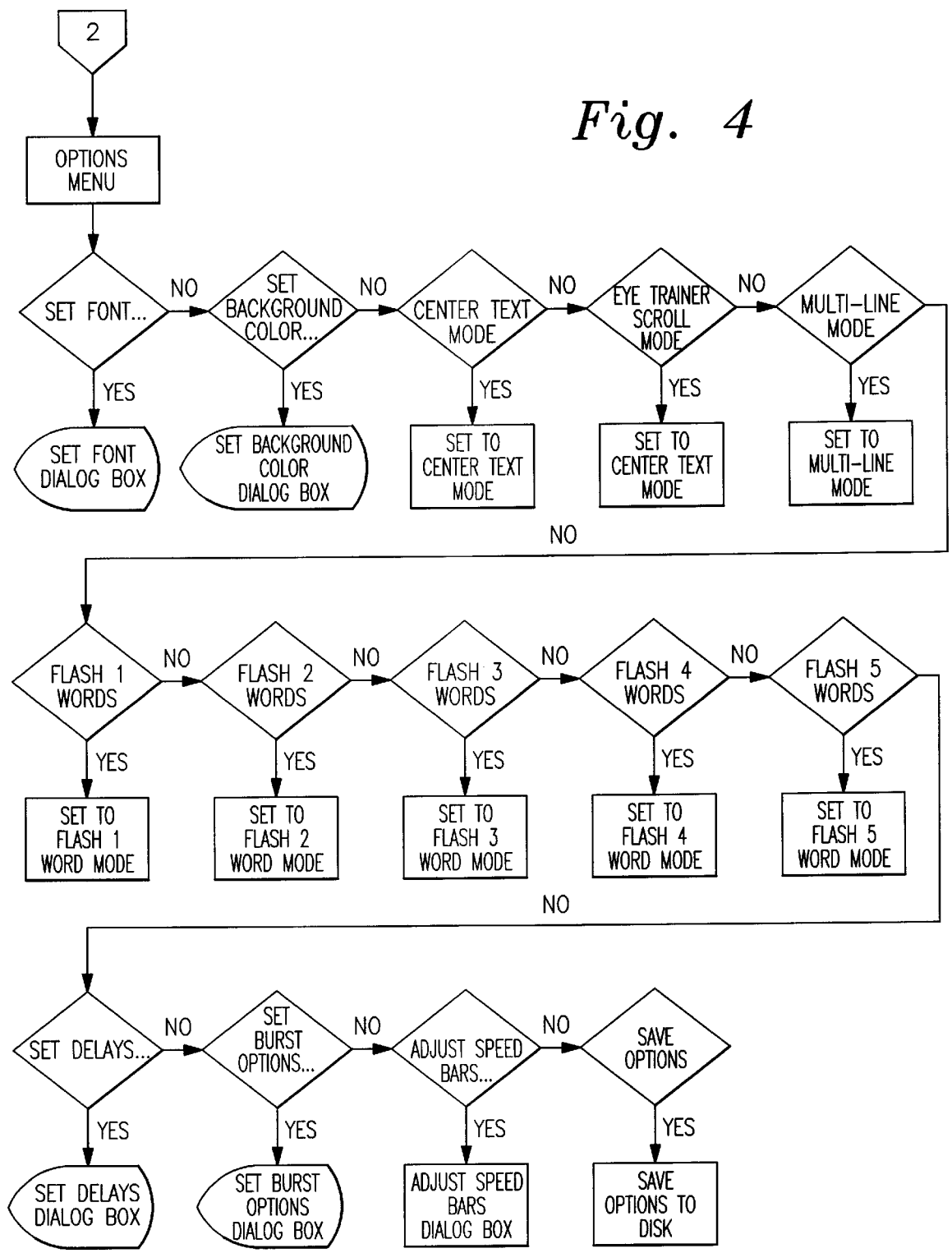
Figure 5:
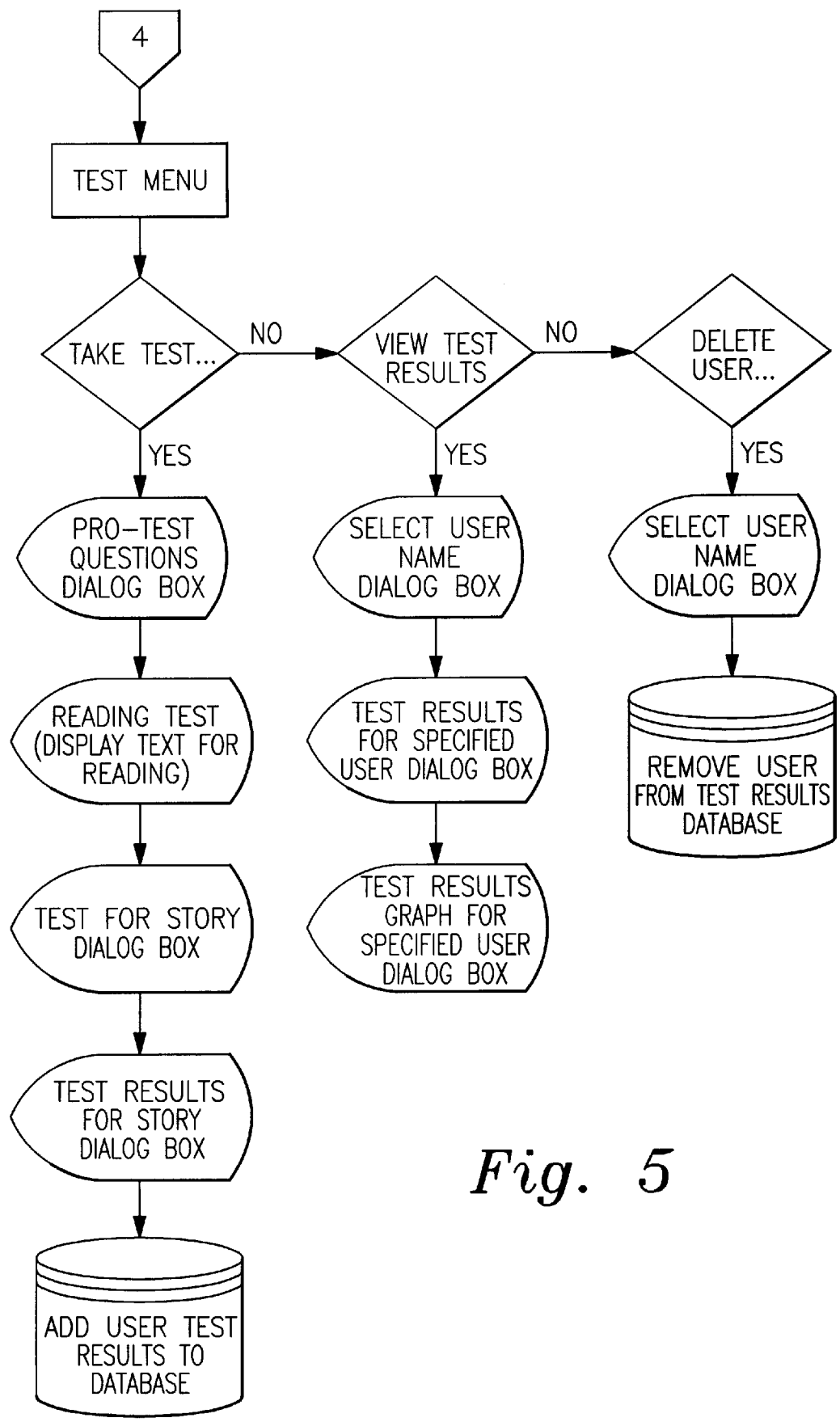
Figure 6:
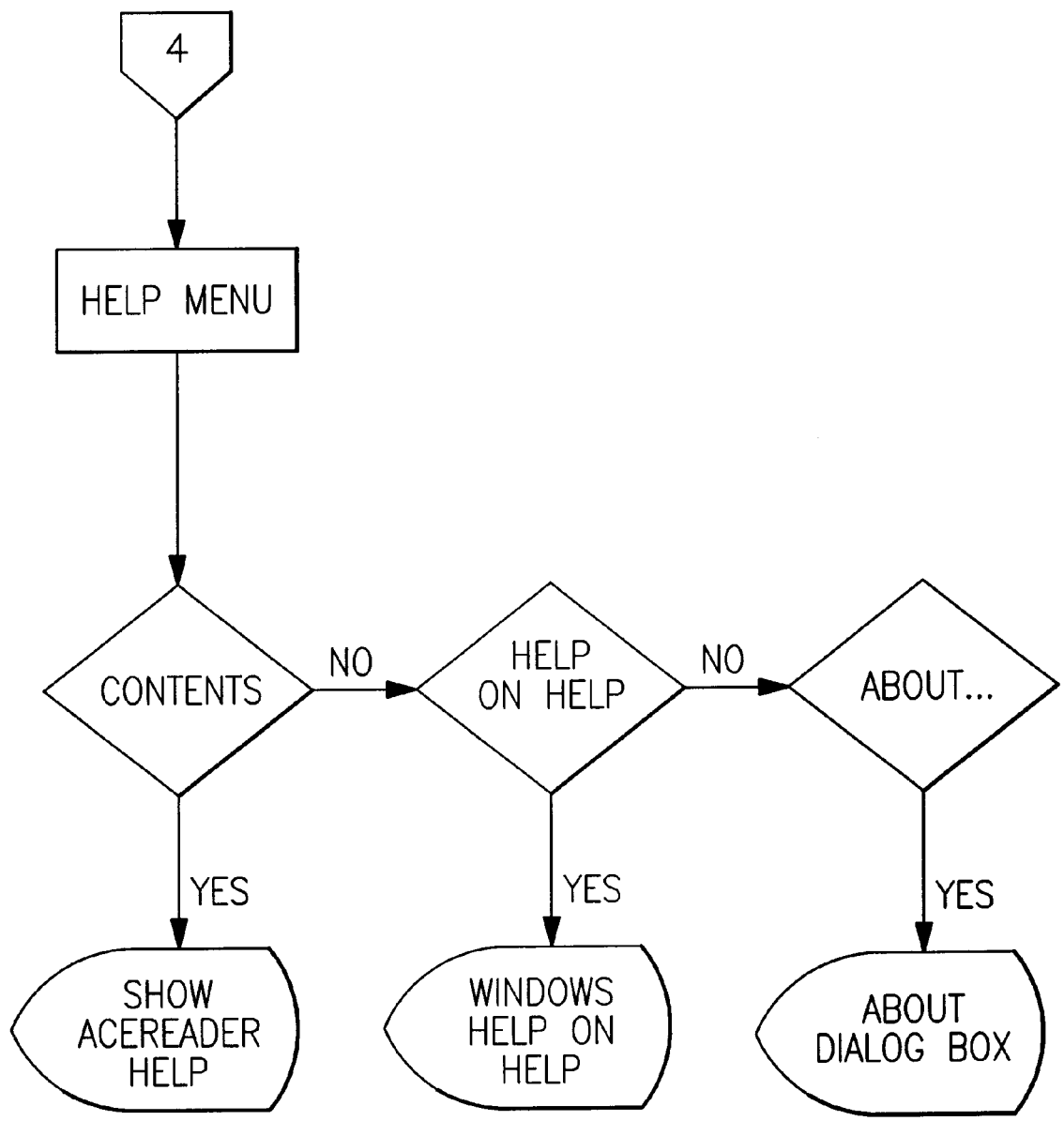

Enablement of the present invention is achieved via a software program represented by the diagram shown in FIGS. 2–6. In FIG. 2 is shown a main screen which displays the functions listed to the right of "Main Screen" and which are shown in a preferred physical layout of the computer screen in FIG. 1. Also, four pull-down menus are provided on the screen: File Menu, Options Menu, Test Menu and Help Menu. The File Menu, as shown in FIG. 2, provides for selection of the functions of loading the textual matter from a data file or from the computer stored clipboard. Program exit function is provided here as well. Selecting the Options Menu, as shown in FIG. 4, provides access to changing the font in which the textual matter will be presented, changing the background color of the screen, changing the position on the screen and the number of words to be presented during each textual portion in which the textual matter will be presented, and changing between single and multiple line displays. This menu also enables the setting of punctuation delays as described above and several other operational options. The Test Menu, as shown in FIG. 5 provides for selecting certain variables enabling the execution of a reading test, viewing results in several ways, including graphically, and managing user identities in a database. In FIG. 6 is shown the contents of the Help Menu and its several selections.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for improving reading speed with comprehension comprising the steps of:

a) providing textual matter in a machine readable format;

b) presenting a designated text display area indicia on a video monitor screen;

c) presenting input device controllable operational indicia on the video monitor screen;

d) displaying the textual matter within the word display area indicia on the video monitor screen, the textual matter being segmented into textual portions, each of the portions appearing on the monitor screen for a selected duration and at the termination of the selected duration being instantly replaced by each subsequent one of the textual portions in turn, the operational indicia functional for adjusting the approximate quantity of textual matter in each of the textural portions;

e) displaying a device controllable set of burst buttons on the video monitor screen;

f) selecting one of the burst buttons to re-read a previous set of words;

g) selecting another of the burst buttons to re-read a last displayed set of words;

h) selecting a still further one of the burst buttons to display a new set of words;

i) displaying a device controllable set of search buttons on the video monitor screen;

j) selecting one of the search buttons to find a specific word within the textural matter;

k) selecting another of the search buttons to find a set of words within the textural matter;

l) selecting a still further one of the search buttons to find a sentence within the textural matter;

m) displaying a device controllable, scrollable indicia enabled for searching the textual matter data file forward or backward and for displaying the textural matter accordingly; and n) selecting and dragging the operational scroll indicia to move forward or backward respectively within the textural matter.

2. The method of claim 1 wherein each of the portions of the textual matter, in turn, is centered in the word display area from left to right.

3. The method of claim 1 wherein each of the portions of the textual matter is positioned, in turn, to the right of each previously displayed of the portions of the textual matter, as space in the word display area indicia is available therefor, and at the leftmost position of the word display area when such space is not available.

4. The method of claim 1 wherein the textual matter display is started and stopped, with a video monitor screen pointing device operational for manipulation of the input device controllable operational indicia.

5. The method of claim 1 wherein a numerical reading rate is displayed the monitor screen upon termination of the displaying of the textual matter.

6. The method of claim 1 wherein the textual matter is displayed with hesitations at selected punctuation marks.

7. An apparatus for use in improving reading speed with comprehension comprising:

a computer system having a means for data storage, a means for data computation and presentation formatting, and a means for data display;

the data display means providing an animated designated word display area and a plurality of animated, input device controllable, operational indicia;

the data computation and presentation formatting means being enabled for presenting a textual matter data file selected from the data storage means, on the data display means as a series of textual portions in timed sequence with each of the textual portions being replaced by a next said textual portion in turn;

a set of selectable burst buttons on the video monitor screen enabled for displaying a preset number of words or sentences before stopping such that users can burst back to re-read a previous set of words, repeat to reread the last set of words, or go forward with a new set of words;

a set of selectable search buttons on the video monitor screen enabled for selecting one of the search buttons to find a specific word within the textural matter, selecting another of the search buttons to find a set of words within the textural matter, and selecting a still further one of the search buttons to find a sentence within the textural matter; and an operational indicia enabled for searching the textual matter data file forward or backward and for displaying the data file accordingly by dragging the operational indicia with a pointing device.

8. The apparatus of claim 7 wherein the input device controllable, operational indicia comprise a start-play indicia, a stop-play indicia, a speed control indicia, a backup, forward and repeat selection indicia, a location marker indicia pictorially representing an approximate present text location position within the data file selection, a backup by one textual portion indicia, and a move-forward by one textual portion indicia.

9. The apparatus of claim 8 wherein the speed control indicia provides a bar graph, the animation thereof indicating the setting of display speed as a color differentiation between individual bars of the bar graph.

10. The apparatus of claim 7 wherein the input device controllable, operational indicia further comprise a search indicia enabled for searching the textual matter data file.

11. The apparatus of claim 10 wherein the search indicia is enabled for searching the data file for a single word, for multiple words and for a sentence.

12. The apparatus of claim 7 wherein the data display means further provides an indicia for indicating the speed of the data file display after at least a portion thereof has been displayed and wherein the data computation and presentation formatting means is enabled for calculating such speed.

13. The apparatus of claim 7 wherein the input device controllable, operational indicia further comprises a scroll indicia enabled for searching the textual matter data file forward or backward and for displaying the data file accordingly.

14. The apparatus of claim 7 wherein the data computation and presentation formatting means is enabled for providing the textual matter to be displayed with hesitations at selected punctuation marks.

* * * * *